United States Patent [19]
O'Rourke

[11] Patent Number: 5,925,244
[45] Date of Patent: *Jul. 20, 1999

[54] BEVERAGE-SCREENING FILTER LEAF HAVING WOVEN SCREEN SUPPORTED AGAINST DEFLECTION

[76] Inventor: Sheldon G. O'Rourke, 24 Windswept Dr., Arnold, Mo. 63010

[*] Notice: This patent is subject to a terminal disclaimer.

[21] Appl. No.: 08/977,996

[22] Filed: Nov. 25, 1997

Related U.S. Application Data

[63] Continuation-in-part of application No. 08/844,868, Apr. 22, 1997

[60] Provisional application No. 60/016,878, May 6, 1996.

[51] Int. Cl.⁶ .................................................. B01D 29/36
[52] U.S. Cl. .......................... 210/232; 210/346; 210/486
[58] Field of Search .................................... 210/232, 238, 210/322, 323.1, 346, 486, 487, 488, 489

[56] References Cited

U.S. PATENT DOCUMENTS

| | | |
|---|---|---|
| 2,964,194 | 12/1960 | Oliver, Jr. et al. . |
| 3,486,627 | 12/1969 | Ashby et al. . |
| 3,499,535 | 3/1970 | Zievers et al. . |
| 3,542,205 | 11/1970 | O'Cheskey . |
| 3,623,614 | 11/1971 | Schmidt, Jr. . |
| 3,756,417 | 9/1973 | MacQuilkin et al. . |
| 4,077,887 | 3/1978 | Langvik .................................. 210/331 |
| 4,179,378 | 12/1979 | Borre . |
| 4,330,405 | 5/1982 | Davis et al. ............................. 210/331 |
| 4,776,958 | 10/1988 | Stephenson ............................. 210/486 |
| 4,790,935 | 12/1988 | Johnson .................................. 210/232 |
| 4,863,656 | 9/1989 | Hindstrom .............................. 210/331 |
| 4,865,732 | 9/1989 | Garrant et al. .......................... 210/232 |
| 4,964,987 | 10/1990 | Johnson .................................. 210/332 |
| 5,076,924 | 12/1991 | Persson et al. .......................... 210/489 |
| 5,360,541 | 11/1994 | Gerakios ................................. 210/232 |
| 5,635,062 | 6/1997 | Cameron et al. ....................... 210/232 |

*Primary Examiner*—David A. Reifsnyder
*Attorney, Agent, or Firm*—Armstrong, Teasdale LLP

[57] ABSTRACT

A leaf filter for filtering solid particles from a liquid in a pressure tank. The leaf filter includes a metallic frame with a perimeter adapted to fit within the pressure tank. A flange with at least one groove in each outer surface, projects planar around the outer perimeter of the frame. The leaf filter has a filtering element with a perimeter that is larger than the perimeter of the frame. A compressible elastic cord is adapted to compressibly engage the flange groove. The cord secures the outer edge of the filtering element to the groove thereby holding the filtering element planar and taut on the frame.

19 Claims, 2 Drawing Sheets

BEVERAGE-SCREENING FILTER LEAF HAVING WOVEN SCREEN SUPPORTED AGAINST DEFLECTION

This application is a continuation-in-part of U.S. application No. 08/844,868, filed Apr. 22, 1997 now allowed which claims the benefit of U.S. Provisional application No. 60/016,878, filed May 6, 1996.

FIELD OF THE INVENTION

This invention relates generally to pressure leaf filters for separating particulate matter from liquids and more particularly, to such a filter including a metallic leaf and a woven mesh screen.

BACKGROUND OF THE INVENTION

Pressure leaf filters are well known for use, for example, in the beverage industry to eliminate tiny particles of matter. The liquid to be filtered is introduced, under substantial pressure, into large pressure tanks containing multiple filter leaf elements. The pressure drives the liquid from the exterior of the filter leaf elements to their interior, from which it flows through a common manifold to the exterior. Such filtering systems are available from numerous sources, such as the Duriron Company of New York. Filter leaf elements of varying design are available from sources as the Duriron Company of New York, as well as the Lenser Company of Germany.

At least two types of pressure leaf filter element constructions are known. One type, of welded stainless steel construction, includes a filtering screen through which liquid is pumped. The screen typically contains a covering of diatomaceous earth. The filtering screen on the outer side of the leaf may be supported inwardly by a succession of coarser screens or perforated plates through which the screened liquid is drained. These leaf elements are typically costly, heavy, and not easily repaired if their filtering screens are damaged.

Another known pressure filter leaf construction uses a fabric bag loosely enclosing a polypropylene element molded with parallel grooves perforated to lead to a hollow interior from which the liquid, screened by the fabric of the bag, is drained through a common outlet. As a disadvantage, if the bag is loose, inflow pressure may press the weave into the groove of the plastic leaf element, whereas if the bag is tight, the weave may be distorted enlargingly in either case defeating its intended function as a precise screen.

It would be desirable to have a pressure leaf filter element that is easily repaired when the filtering screen is damaged. It is also desirable to have a pressure leaf filter element where the filtering screen does not loose its taughtnes, ie., is not too tight or too loose, during operation.

SUMMARY OF THE INVENTION

These and other objects may be attained by a fabricated metallic pressure leaf filter element having a screening element that is inexpensive and easily replaceable (especially when compared to welded metal leaf screens). The fabricated metallic pressure leaf filter element functions as effectively as the welded metal screens, and without the aforementioned problems associated with the use of fabric bags.

The present metallic leaf frame is of such size and shape to fit, side-by-side, within the pressure tank, which may be of a chosen depth, for example, four feet. At each side, the leaf frame's rim has a groove used for mounting a fine-mesh filtering screen stretched thereacross, preferably of any durable synthetic plastic cloth, but even of cloth-like metal sufficiently deformable for attaching as hereafter described.

The filtering elements or screens are attached to the metallic frame across the rim surface by inserting the edge of a filtering screen into the circumferential groove in each rim face, and pressing over the filtering screen's edge and into the groove a compressible elastic cord capable of being radially-inward compressed to hold the screen planar and taut. To support the filtering screens against out-of-plane deflection due to the inflow pressure, the frame contains, between the filtering screens, conventional three-dimensional lattice-like spacing members. The lattice-like structure permits flow through the leaf filter. Typically two sizes of lattice-like members are used. The lattice-like members immediately adjacent to the filtering screen are typically relatively fine, and are in turn supported by a coarser lattice structure adjacent to the central support panel. Such lattice members facilitate outflow through a bottom central outlet. The lattice members are sized so as not to contact the bottom central outlet to facilitate flow through the leaf filter.

DETAILED DESCRIPTION

Figure 1:
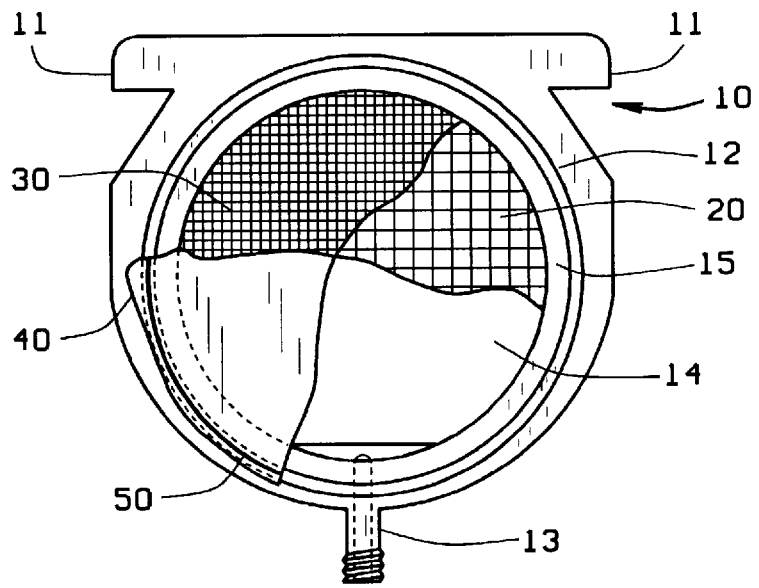
FIG. 1 is a plan view of an assembled filter leaf with all elements except its fabricated metallic frame partially broken away to show its molded central divider panel.
Figure 2:
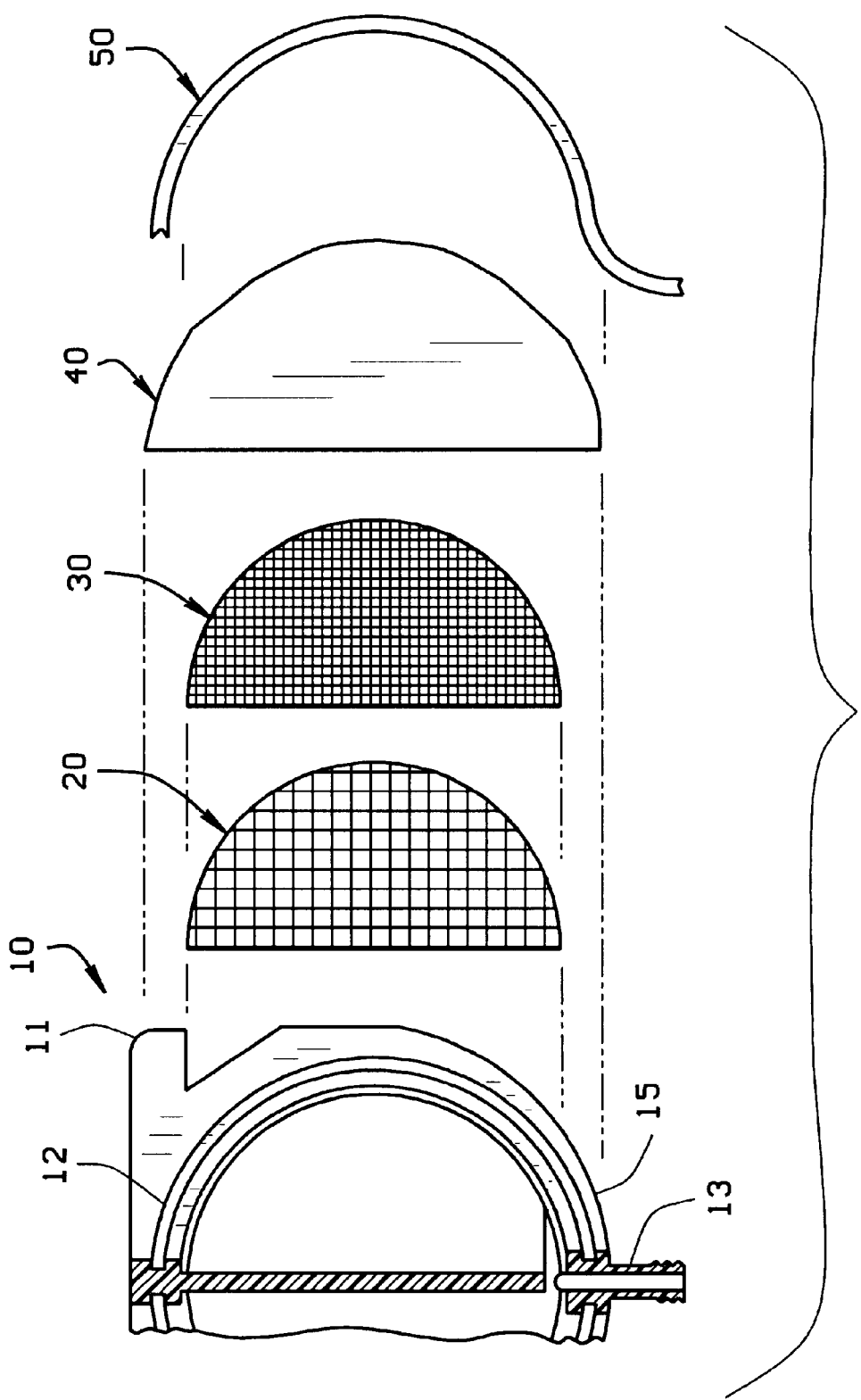
FIG. 2 is an exploded view of one half of the leaf element of FIG. 1 showing halves of its metallic central panel and of the members fitted thereon.

As shown in FIGS. 1 and 2 each filter leaf 8 has a frame 10, which may be as much as five feet deep, being shaped to fit within a pressure tank of chosen design and suspended by their upper support ears 11 as part of a parallel-aligned battery of such suspended leaves. Other embodiments of leaf frame 10 may have other means of support and alignment. For example bars with slats spaced to receive leaf frame 10 or finger leaf spacers positioned within the pressure tank. Leaf frames 10 are fabricated of a metallic material inert to the liquid to be screened. Fabrication of leaf frame 10 of a metallic material gives leaf frame 10 dimensional stability over a wide range of temperatures and thus will reduce any distortion of filter element 40. If leaf frame 10 expanded during use, filter element 40 may stretch too tight which may distort and enlarge the mesh of filter element 40, thus reducing the effectiveness of leaf filter 8. If leaf frame 10 contracted during use, filter element 40 may become too loose which may allow inflow pressure to press the mesh into the groves of lattice-like spacing member 30 causing loss of filter effectiveness. By fabricating leaf frame 10 from a metal helps prevent undue expansion or contraction of leaf frame 10 during operation. Any metal that provides the required strength and is inert to the liquid to be screened may be used to fabricate leaf frame 10. Suitable but non-limiting examples include brass, aluminum, titanium, stainless steel and the like. Preferably, the metal is stainless steel.

A central support panel 14 is shaped to fit within leaf frame 10 along the central plane of leaf frame 10 above drainage outlet 13. Central support panel 14 may be a solid metal panel, a 1 by 1 metal screen or a tubular slit panel made from a series of tubes welded together with each tube having a slot to facilitate drainage. Central support panel 14 may be attached to leaf frame 10 by the use of adhesives, welding, mechanical fasteners, or any other method known in the art.

On each side of central support panel 14, leaf frame 10 has a projecting preferably planar rim or flange 15 around its perimeter. A groove 12 is machined into the outside surface of flange 15. Groove 12 may be square cut, keyhole shaped, dovetail shaped, or the like. Groove 12, together with a compressible elastic cord 50 whose diameter must be compressed to fit within groove 12, tautly secures the outer edge of filtering element 40. This mounting system permits filtering element 40 to be easily replaced. In a modified embodiment, two or more concentric grooves 12 are machined into each outer surface of flange 15. The additional grooves aids in the retention of filter element 40. One compressible elastic cord 50 is used in each groove to secure filtering element 40 to leaf frame 10.

Filtering element 40 may be referred to as the filtering screen and is typically a plastic cloth material woven of nylon, polypropylene, or polyethylene, available from Tetko, Inc., Briarcliff Manor, New York. Alternatively, a very fine flexible mesh metal screen may be employed. For typical applications, filter element 40 is coated with fuller's earth or diatomaceous earth.

Figure 3:
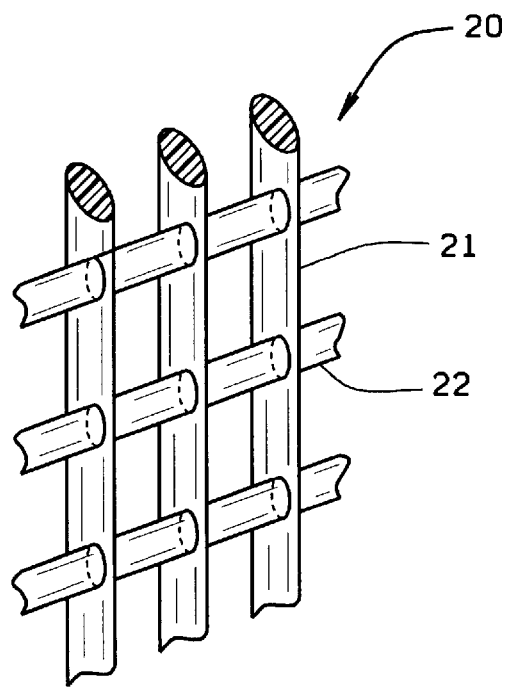
FIG. 3 is a fragmentary view of a coarser spacing lattice portion, illustrating how its vertical spacing members, being substantially larger than its horizontal members, readily conduct flow downward to the leaf's flow outlet.

Because of the relatively high pressure within the filter tank which drives the liquid through the woven screen, inward flexure would be likely to impermissibly enlarge the screen's mesh. To avoid such out-of-plane distortion, lattice-like spacing members 20 and 30 (not drawn to scale) are utilized whose combined thickness equals the depth of rim 15 above central support panel 14. Lattice-like spacing members 20 and 30 may be made from plastic. Sheets of such lattice-like plastic material are commercially available from Internet, Inc. of Minneapolis, Minn. However spacing members 20 and 30 may be made from metal, for example brass, aluminum, titanium, stainless steel and the like. One embodiment utilizes the combined spacing-thickness of two such spacing members, the outer of these, designated 30, having such smaller lattice spacing to prevent the inflow pressure from significant distortion of the mesh, while the larger lattice 20 serves to support smaller lattice 30 and permits easy downflow to drainage outlet 13. FIG. 3 shows the vertical members 21 of coarser lattice 20 may project farther inward than its horizontal members 22, thus facilitating drainage. For example, larger lattice 20 may be a 4 by 4 metal mesh or the like. Larger lattice 20 may be tack welded to central support panel 14 to prevent movement during operation. Smaller lattice 30 may be a metal screen that has a finer mesh than larger lattice 20 and a coarser mesh than filtering element 40. Alternatively, smaller lattice 30 may be a perforated metal panel having perforations that are larger than the mesh of filtering element 40 and smaller than the mesh of larger lattice 20. Leaf frame 10 common drainage outlet 13 receives flow from both sides of central support panel 14. Central support panel 14 is sized so as not to contact drainage outlet 13 to facilitate flow through leaf filter 8.

In a modified embodiment, leaf frame 10 contains no central support panel 14, and instead a single heavy lattice (not illustrated) may fill the entire spacing between two fine lattices 30 which support two filtering elements 40 on opposite sides of leaf frame 10.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A leaf filter for filtering solid particles from a liquid in a pressure tank, the leaf filter comprising:

a metallic frame having a perimeter adapted to fit within the pressure tank, the metallic frame having a drainage outlet along its central plane at its lower edge, whereby liquid inflow from opposite sides of the frame is discharged through the drainage outlet;

a rim projecting planar around the frame perimeter, the rim having at least one groove in each of its two outer surfaces;

filtering elements having outer edges, supported by the frame, the filtering elements configured to mount to the frame;

compressible elastic cords adapted to fit within the grooves; wherein the filtering elements are inserted in the grooves and the cords compress to securely engage the filtering elements in the grooves holding the filtering elements planar and taut within the frame; and lattice spacing members adjacent and interposed between the filtering elements, the lattice spacing members comprising a course lattice spacing member interposed between two fine lattice spacing members.

2. The leaf filter of claim 1 further comprising a central support panel, the central support panel adapted to fit within the frame above the drain outlet along the central plane of the frame.

3. The leaf filter of claim 2 wherein the central support panel is a 1 by 1 metal screen.

4. The leaf filter of claim 2 wherein the central support panel is a tubular slit panel.

5. The leaf filter of claim 2 wherein the frame further comprises lattice spacing members adjacent the filtering elements and interposed between the central support panel and each filtering element.

6. The leaf filter of claim 5 wherein the combined thickness of the lattice spacing members is substantially the same as the depth of the rim above the central support panel.

7. The leaf filter of claim 5 wherein the lattice spacing members comprise first lattice members immediately adjacent the filtering element and second lattice members immediately adjacent the central support panel, wherein first lattice members comprise a smaller spaced lattice and second lattice members comprise a larger spaced lattice.

8. The leaf filter of claim 7 wherein the second lattice member comprises horizontal members and vertical members which form a criss-cross pattern.

9. The leaf filter of claim 8 wherein the second lattice spacing member is a 4 by 4 metal screen.

10. The leaf filter of claim 8 wherein the vertical members project farther inwardly toward the central support panel than the horizontal members to facilitate drainage into the drain outlet.

11. The leaf filter of claim 1 wherein the frame further comprises upper support ears for suspending the frame within the pressure tank.

12. The leaf filter of claim 1 wherein the frame is fabricated from one of brass, aluminum, titanium, and stainless steel.

13. The leaf filter of claim 1 wherein the frame is fabricated from stainless steel.

14. The leaf filter of claim 1 wherein the cord is elastic rubber.

15. The leaf filter of claim 1 wherein the cord has a diameter that is larger than the width of the groove, whereby the cord compresses to engage the groove.

16. The leaf filter of claim 1 wherein the filtering element is coated with diatomaceous earth.

17. The leaf filter of claim 1 wherein the filtering element is plastic cloth material.

18. The leaf filter of claim 1 wherein the filtering element is fine flexible mesh metal.

19. A leaf filter for filtering solid particles from a liquid in a pressure tank, the leaf filter comprising:

a metallic frame having a perimeter adapted to fit within the pressure tank, the metallic frame having a drainage outlet along its central plane at its lower edge, whereby liquid inflow from opposite sides of the frame is discharged through the drainage outlet;

filtering elements having outer edges, supported by the frame, the filtering elements configured to mount to the frame;

a central support panel shaped to fit within the frame along its central plane above the drainage outlet, wherein the central support panel is interposed between the filtering elements;

a rim projecting planar around the frame perimeter, the rim having at least one groove in each of its two outer surfaces;

compressible elastic cords adapted to fit within the grooves; whereby the filtering elements are inserted into the grooves and the cords compress to securely engage the filtering elements in the grooves thereby holding the filtering elements planar and taut within the frame; and lattice spacing members adjacent the filtering elements and interposed between the central support panel and each filtering element, the lattice spacing members comprise first lattice members immediately adjacent the filtering elements and second lattice members immediately adjacent the central support panel wherein the first lattice members comprise a smaller spaced lattice and the second lattice members comprise a larger spaced lattice.

* * * * *